Figure 1:
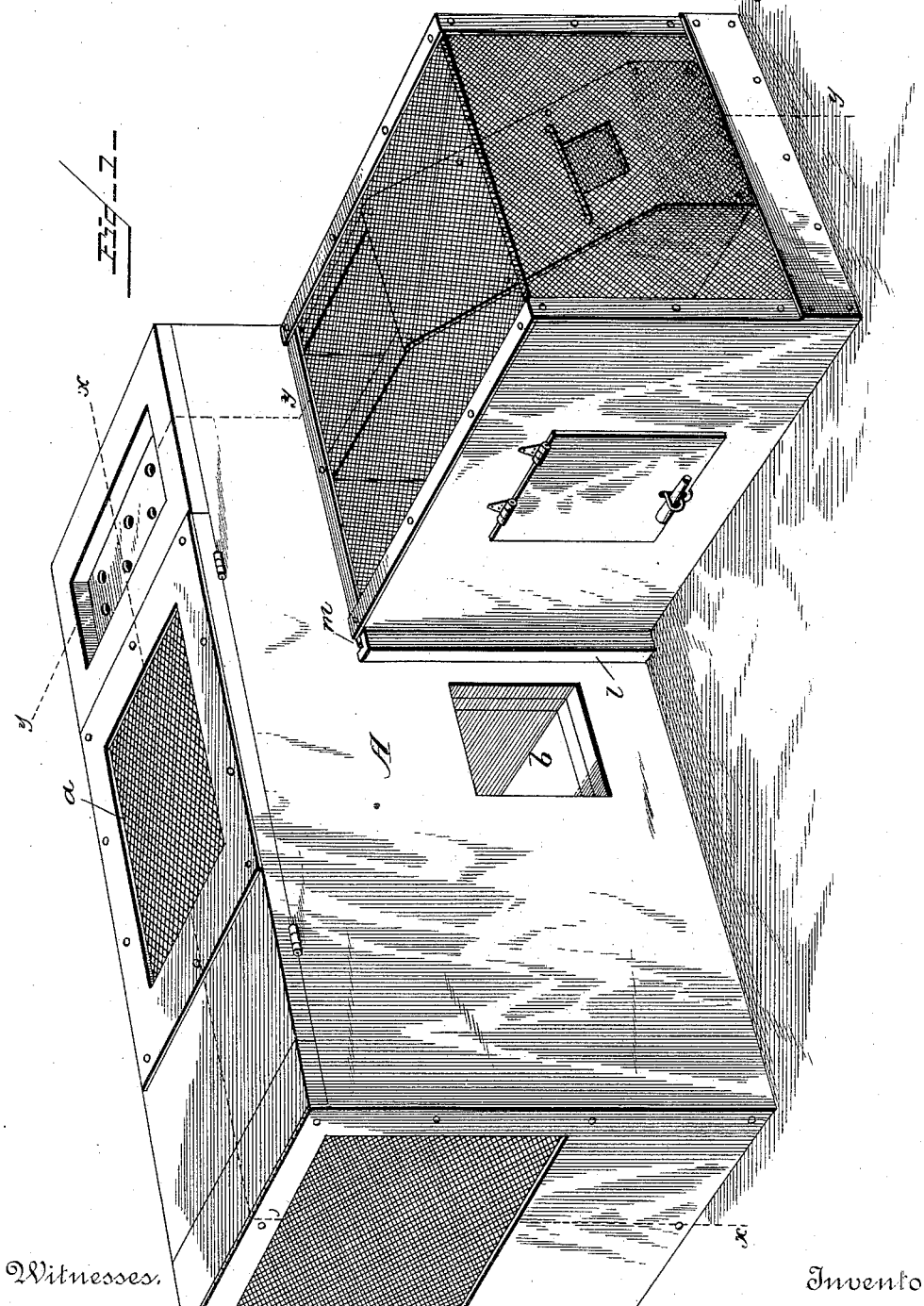

(No Model.) 2 Sheets—Sheet 1.

G. J. McMILLAN.
ANIMAL TRAP.

No. 385,421. Patented July 3, 1888.

Witnesses.
Albert Spuden,
Wm. B. McCarthy,

Inventor.
George J. McMillan.
By his Attorney
Chas. H. Fowler.

N. PETERS, Photo-Lithographer, Washington, D. C.

(No Model.) 2 Sheets—Sheet 2.
G. J. McMILLAN.
ANIMAL TRAP.
No. 385,421. Patented July 3, 1888.
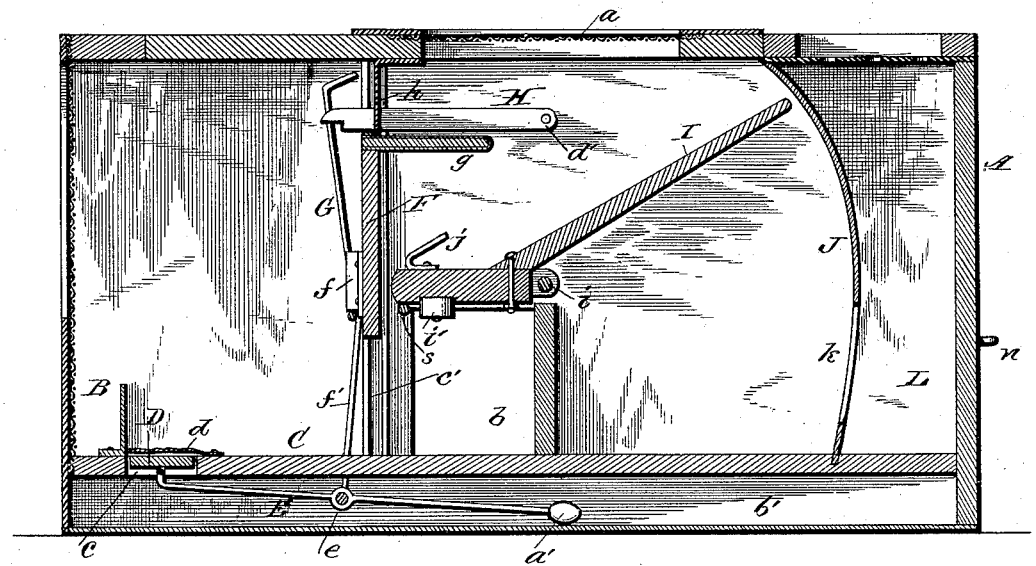
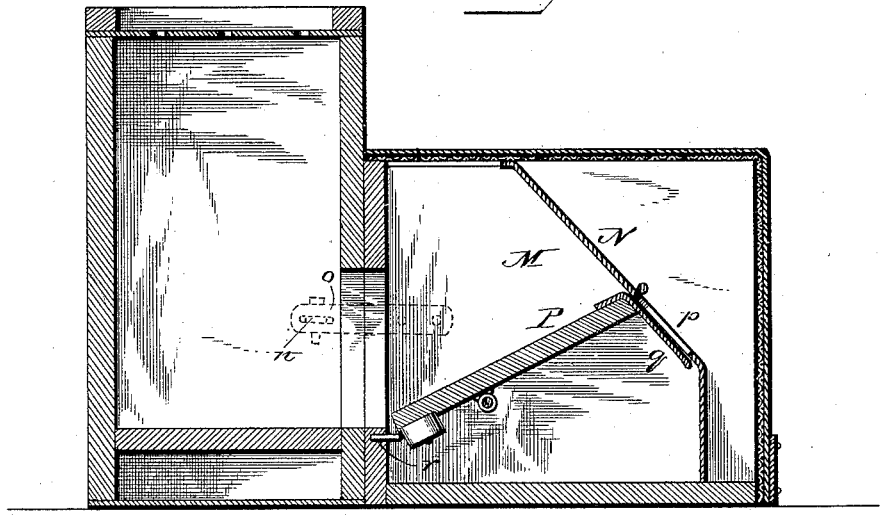
Witnesses.
Albert Speiden
Wm. B. McCarthy
Inventor.
George J. McMillan
By his Attorney
Chas. H. Fowler

UNITED STATES PATENT OFFICE.

GEORGE J. McMILLAN, OF TEACHEY'S, NORTH CAROLINA.

ANIMAL-TRAP.

SPECIFICATION forming part of Letters Patent No. 385,421, dated July 3, 1888.

Application filed April 9, 1888. Serial No. 270,103. (No model.)

*To all whom it may concern:*

Be it known that I, GEORGE J. MCMILLAN, a citizen of the United States, residing at Teachey's, in the county of Duplin and State of North Carolina, have invented certain new and useful Improvements in Animal-Traps; and I do hereby declare that the following is a full, clear, and exact description of the same, reference being had to the annexed drawings, making a part of this specification, and to the letters and figures of reference marked thereon.

This invention relates to certain new and useful improvements in animal-traps; and the novelty resides in the peculiar combinations and the construction, arrangement, and adaptation of parts, all as more fully hereinafter described, shown in the drawings, and then particularly pointed out in the appended claims.

The invention is clearly illustrated in the accompanying drawings, in which—

Figure 1 is a perspective view of an animal-trap embodying my improvements. Fig. 2 is a vertical longitudinal section of the same through the line $x\ x$ of Fig. 1, and Fig. 3 is a vertical transverse section through the line $y\ y$ of Fig. 1.

Referring to the details of the drawings by letter, A designates a suitable box, preferably rectangular in form, provided with a hinged top, which is provided with a suitable opening covered by some material, $a$—such as wire, wire-gauze, perforated metal, or the like—to permit an inspection of the interior without lifting the cover, and also to provide an inlet for fresh air. One end, also, is preferably provided with similar opening and netting or the like, as shown.

The sides of the box are provided with apertures $b$, for the admission of the animal. At one end the box is provided with the bait-box B, adjacent to which the bottom C of the box is provided with an opening, $c$, covered by a piece of carpet or other suitable material, $d$, beneath which is the platform or rest D, carried by one end of the lever E, pivoted at $e$, the other end of said lever being weighted, as at $a'$, and the said lever operating within a compartment, $b'$, beneath the bottom C of the box. This platform works loosely in the opening $c$ and normally has its upper face flush with the top face of the bottom C of the box.

The sides of the box to one side of the apertures $b$ are provided with the vertical guides $c'$, in which works the door F, provided near its lower end with the lug or catch $f$ and near its upper end with the right-angled piece $g$.

G is a link or loop pivoted at opposite ends of the sides of the box at the upper end of the box and arranged to normally extend under the catch $f$, as shown in Fig. 2. A stop, $h$, is secured to the top of the box, within the same, to limit the upward movement of the door F. The lever E carries an upwardly-extending arm, $f'$, which normally extends back of the link G, as shown in Fig. 2.

H is a button or arm pivoted at $d'$ to one side of the box, on the interior thereof, and formed with a hooked or notched end, as shown.

As the rat or other animal enters the box and attempts to get the bait, he treads on the carpet $d$, which yields to his weight, and he is thrown upon the platform D, which descends, and as it descends the arm $f'$ of the lever E is thrown forward from engagement with the catch $f$ and the door F drops. As the door drops, the arm H falls and its notch engages the upper edge of the door and holds it down. The noise caused by the falling door naturally frightens the animal, and he seeks to escape. Of course he cannot escape through the opening through which he entered, for this is now closed by the door; but there is an opening above the door, through which he now goes. Going through the opening, he lands upon the tilting-lever I, pivoted at $i$ and weighted, as shown, at $i'$. This lever carries a lug, $j$, which, as the long arm of the lever descends through the medium of the weight of the animal, rises with the short arm and strikes the piece $g$ of the door, carrying it up with it until said piece engages the stop $h$. As soon as the door has been raised a sufficient distance for the catch $f$ to be above the bottom of the loop or link G, said link will fall into its normal position beneath the catch, and thus hold the door elevated, and thus set the trap. As the lever I falls by the weight of the animal, the animal will naturally seek to escape and will pass through the opening $k$ in the partition J into the compartment L, the lever I assuming its normal position, preventing the animal from returning. From the compartment L is an outlet into the cage M, which is removably secured to the box A, preferably as shown in Fig. 1, in which *l* are guides secured to the side of the box and adapted to receive the guiding-pieces *m* on the end of the cage. The end of the box A is provided with a staple, *n*, to engage the eye of the arm *o* on the side of the cage, by means of which and a suitable pin the cage and box may be held together. The cage is divided into two compartments by means of the partition N, provided with a suitable outlet, *p*.

P is a weighted lever pivoted within the inner compartment of the cage and carrying at its end nearest to the opening in the partition a strip, *q*, which serves to close said opening when the lever is in its normal position, as shown in Fig. 3. A stop, *r*, is provided to limit the downward movement of the lever P, and a similar stop, *s*, serves a similar purpose in connection with the lever I, as seen in Fig. 2. The cage is provided with a suitable door through which the animals may be removed when desired, and a portion of said cage is covered with wire-netting or the like, as shown.

What I claim as new is—

1. The combination, with the box provided with an opening in its bottom, of the pivoted lever, the platform carried thereby, the vertically-operating door, the link normally holding said door in an elevated position, and the vertical arm on said lever to operate said link, substantially as and for the purpose specified.

2. The combination, with the pivoted lever and the arm *f'*, carried thereby, of the vertically-operating door, the catch thereon, the link engaging said catch, and the gravity-arm above the door, all substantially as and for the purpose specified.

3. The combination, with the vertically-operating door and the catch carried thereby, of the pivoted lever, the vertical arm carried thereby, the link engaging said catch, the gravity-arm, and the piece *g* on said door at right angles to the height thereof, substantially as shown and described.

4. The combination, with the vertically-operating door and the piece *g* thereon, near the top thereof, and extending at right angles thereto, of the tilting lever I and the lug on said lever engaging said piece *g*, substantially as and for the purpose specified.

5. The combination, with the vertically-operating door, the arm *g* thereon, and the gravity-arm, of the tilting lever and the lug carried by the short arm thereof and arranged to engage the piece *g* on the door, substantially as and for the purpose specified.

6. The combination, with the vertically-operating door, the catch thereon, the link engaging said catch, the pivoted lever E, and the vertical arm carried by said lever, of the piece *g* on the upper end of said door, the gravity-arm, and the lever I, carrying lug adapted to engage said piece *g*, substantially as and for the purpose specified.

7. The cage provided with partition N, having opening *p*, combined with the tilting lever P, pivoted within said cage, and the strip *q*, carried by the end of said lever and serving to close said opening, substantially as and for the purpose specified.

In testimony that I claim the above I have hereunto subscribed my name in the presence of two witnesses.

GEORGE J. McMILLAN.

Witnesses:
M. W. TEACHEY,
J. C. McMILLAN.